July 2, 1968   Z. KAVAN ETAL   3,390,815
DEVICE FOR ACCURATE DOSING OF LIQUIDS
Filed Sept. 2, 1965
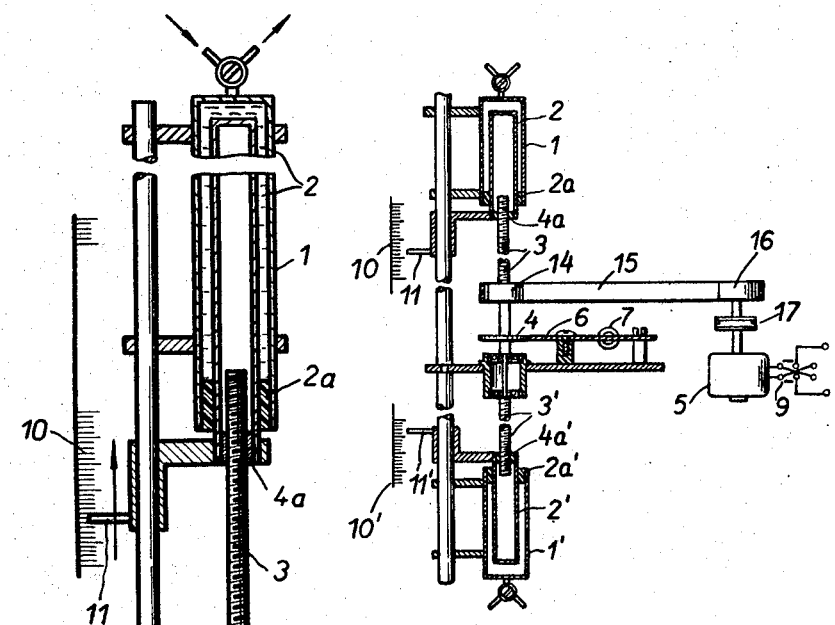
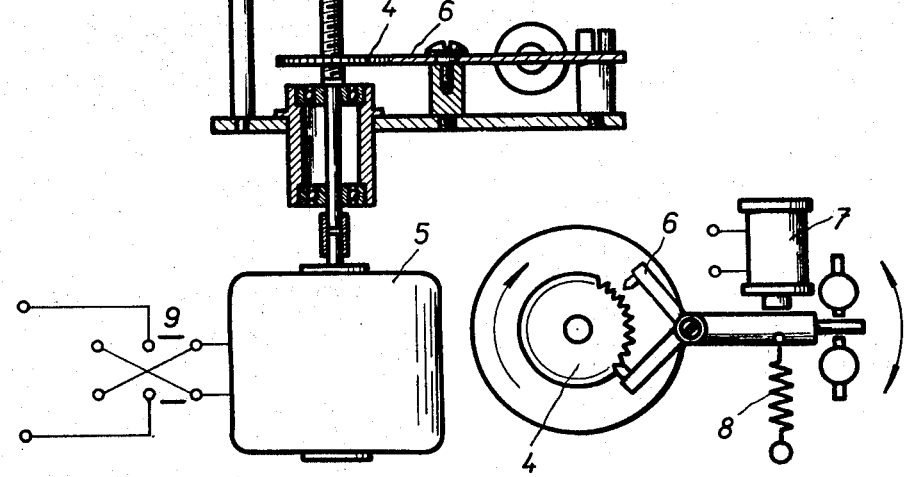
FIG. 1
FIG. 3
FIG. 2
INVENTORS
Zdenek Kavan
Jiri Stemberk
BY Stanislav Sevcik
Michael J. Striker

United States Patent Office 3,390,815
Patented July 2, 1968

3,390,815
DEVICE FOR ACCURATE DOSING OF LIQUIDS
Zdenek Kavan, Jiri Stamberk, and Stanislav Sevcik,
Prague, Czechoslovakia, assignors to Ceskoslovenska
Akademie Ved, Prague, Czechoslovakia
Filed Sept. 2, 1965, Ser. No. 484,683
Claims priority, application Czechoslovakia,
Sept. 18, 1964, 5,205/64
9 Claims. (Cl. 222—137)

The invention relates to a device for accurate dosing of liquids.

Accurate dosing of liquids in dependence on time is a constant problem in laboratory techniques and in some industrial branches, for example in chemistry, food production and other. A dosing device responds to electric, mechanic, pneumatic or other pulses, and it should be perfectly reliable and accurate, which means it should reproduce the supplied pulses without delay and without distortion with respect to their values. The dosing device should also be independent of external conditions or the physical nature and properties of the dosed liquid, it should have a wide range, and should not suffer from corrosion.

The production of regular and programmed supply of the pulses has already been well solved for example by means of capacitive time switches. But dosing devices of existing types are still attended with various drawbacks which prevent their universal application. For example, known electromagnetic control valves intended for reliable dosing require not only a constant level (permanent hydrostatic pressure) of the liquid to be dosed above the valve, but also permanent viscosity which affects the passage of the liquid through the valve in an extraordinary manner. Reliable function of the valve requires a rather heavy magnetic core. The electromagnet requires therefore a rather high current, and in the case of faster dosing it becomes overheated. The electromagnet suffers also from corrosion because it must be arranged directly above the dosing valve. Even a small mechanical impurity may endanger the function of the valve.

Piston type dosing devices are also attended with various drawbacks, particularly unreliable piston packing. The packing is usually made from plastics which have a rather large coefficient of thermal expansion. Even if the dosed liquid does not affect the packing material chemically, there are physical and chemical effects, particularly swelling and de-swelling, which affect the tightness. Piston leakage reduces directly the dosing accuracy. To eliminate leakage without interruption of the operation is impossible. Also the dosing range is rather limited if a piston pump is used. It is quite impossible to change the dosing range at a ratio 1:50 and higher, although this would often be very desirable.

It is a general object of the invention to eliminate the above mentioned drawbacks of dosing devices known in the art.

Stated briefly, the dosing device in accordance with the invention is characterized by the fact that it comprises a plunger, a nut fixed to the plunger, a screw spindle passing through the nut, means connected to the screw spindle for applying a constant torque thereto tending to turn the spindle in one direction, a ratchet wheel fixed to the spindle, and a pulse actuated escape mechanism co-operating with the ratchet wheel and controlling turning of the spindle under the influence of the torque applied thereto.

The dosing is therefore split up into very small doses whose values depend, on the one hand, on the plunger diameter, and on the other hand, on the lead of the spindle thread and also the number of the teeth of the ratchet wheel. The fundamental dose is therefore determined simultaneously by factors which are independent of each other, and can therefore be determined very accurately within extraordinarily wide limits. These fundamental doses can be supplied singly or in groups in a quick sequence and at any desired interval. The sequence of the doses can be readily adjusted at such a fast rate that dosing is actually continuous, for example 20 and more fundamental doses per second. By the combination of the various doses or their sequences following quickly one after the other at time intervals between the individual sequences it is possible to achieve a very wide dosing range, for example 1:1000, and even higher.

The advantage of the plunger in comparison with the piston resides in the fact that instead of an accurate seal, for example a cup, it requires only one packing which can be readily tightened without interrupting the function of the dosing device.

The invention will be best understood from the following specification to be read in conjunction with the accompanying figures, of which:

FIG. 1 illustrates a vertical section through a preferred embodiment of the invention, FIG. 2 illustrates a plan view of the stepping device, and FIG. 3 illustrates a vertical section through another embodiment.

Referring more particularly to FIG. 1, it can be seen that into the housing 1 extends a plunger 2 sealed against the inner surface of the housing by a packing piece 2a. A screw spindle 3 arranged coaxially with the plunger 2 threadingly engages a nut 4a fixed to one end of the plunger 2. The screw spindle 3 is subjected to a constant torque supplied by a driving device whose output shaft can be blocked, for example an electromotor 5 which is fed only with ⅓ of the nominal voltage. The possibility of blocking the output shaft of the driving device is necessary because the output shaft and thus also the screw spindle 3 can only rotate at intervals determined by the stepping or escape mechanism 6. The stepping mechanism 6 with the electromagnet 7 and the return spring 8 receives the respective pulses. The two arms of the stepping devices 6 oscillate about an axis parallel to the spindle axis when the magnet 7 is energized by a pulse imparted thereto and the arms cooperate with a ratchet wheel 4 fixed to the spindle 3 so that each of the pulses permits the ratchet wheel 4 to rotate by one tooth. If the lead of the screw spindle 3 is for example 1 mm., and the diameter of the plunger 12 mm., and the number of teeth of the ratchet wheel 4 is for example 60, one fundamental dose is about 0.0019 ml. If the lead of the spindle turn is only 0.2 mm., the dose decreases to ⅕. The device may therefore also be used for more accurate analytical work. The various doses are derived by progressive insertion of the plunger 2 into the housing 1. As soon as the complete plunger 2 has been inserted into the liquid filled housing 1, the movement of the spindle can for example be reversed by changing the polarity of the motor by means of the switch 9. Due to the oblique shape of the teeth of the wheel 4, the spindle can now turn uninterruptedly because the stepping device has no longer any effect upon it. At the same time a valve or cock in the supply of liquid is opened in the upper part of the housing 1. The time of the return movement and filling of the housing is therefore only short. But even this short interruption can be eliminated by arranging at the other end of the same spindle, for example, a plunger of equal construction, a so-called twin which becomes automatically filled when the first plunger carries out dosing. Dosing is then switched over automatically to the second plunger. An arrangement provided with two plungers is shown in FIG. 3. As can be seen from FIG. 3, the spindle 3 is downwardly extended beyond the bearing supporting the spindle and the downwardly extending spindle portion 3' cooperates with a nut 4a' fixed to the open end of a plunger 2' which extends into an additional container 1' whereby sealing means 2a' located at the open end of the container 1' sealingly engage the outer surface of the plunger 2'. A pointer 11' is preferably also connected to the nut 4a' and the pointer 11' cooperates with a scale 10'. The spindle 3, 3' may be driven directly from an electromotor 5 as shown in FIG. 1. However, in FIG. 3 another drive arrangement for applying a constant torque is shown which will be described later on in detail. Rotation of the spindle is controlled by a ratchet wheel 4 fixed to the spindle and cooperating with an escape mechanism 6, 7 as described above in connection with FIG. 1. Instead of the twin, two devices of exactly the same design may be arranged side by side and operate alternately.

Space may be saved by arranging the spindle inside the plunger.

The scope of the invention is not limited to the embodiment illustrated in the figures. A constant torque may for example be achieved by using a sliding or hydraulic coupling. FIG. 3 also shows an arrangement different from the arrangement shown in FIG. 1 for applying a constant torque to the spindle 3, 3'. As shown in FIG. 3 a pulley 14 is fixed to the spindle and driven from a second pulley 16 by means of a belt 15. The second pulley 16 is driven from the motor 5 over a friction clutch 17 permitting the motor to rotate while the spindle is held stationary by the ratchet wheel 4 and the escape mechanism cooperating therewith. The motor 5 is supplied from a net work over a reversing switch 9 permitting reversal of the rotation of the motor. It is of course possible to obtain the constant torque by the simplest means, such as a weight on a rope or wire wound about a shaft, or a spring. The electromagnet 7 and the spring 8 may also be replaced by a pair of oppositely arranged magnets. The supply of the liquid may also be arranged on the lower part of the housing 1. A venting cock may be arranged on the housing 1. The entire device, particularly the twin arrangement, may be placed horizontally, or inclined, et cetera.

Since any fundamental dose is exactly the same, dosing can be readily controlled by adding a known counting device. The magnitude of the individual doses and the total amount in the rough volume can be read on the scale 10 over which a pointer 11 connected with the nut 4a moves. The fine scale for reading the amount of expelled liquid can be indicated on the disk 12 which rotates with the screw spindle 3. The ratchet wheel, spindle and plunger can be easily replaced. Programming can be readily achieved. It is also easily possible to obtain feedback between the medium into which the liquid is being dosed and the pulse source, for example by means of changes in the conductivity, the electrical voltage, temperature, light absorption, and other physical properties. The device can be easily remote controlled which is very important for work in surroundings contaminated by radioactivity or mechanical harmful matters, such as industrial poisons and carcinogens. The electrical energy consumption is low, the simple construction allows very reliable operation and easy maintenance. The device can be built as large as desired, from a small laboratory device to dosing equipment for pilot plants and plants. If the plunger, the spindle and the ratchet wheel are accurately constructed, dosing my be considered in the widest possible range as absolutely accurate for all practical purposes. The plunger may be constructed for example from glass or molten quartz and optically ground. The electromotor may be replaced by a small water or air turbine. No matter what type of energy is used, variations in the intensity are of no importance. For example, even a varying mains voltage or pressure in the water mains does not matter because even a substantially reduced energy can move the plunger through the very small distance with the movement of the stepping device. Electromagnetic control of the stepping device is also independent from a variation in the mains voltage, and no voltage stabilizers are required.

What we claim is:

1. A device for accurate dosing of a liquid comprising, in combination, a container member having an open end; passage means communicating with the interior of said container member for feeding liquid to be dosed therein to and for discharging the dosed liquid therefrom; a plunger member projecting in a sealed manner through said open end of said container member into the latter; support means mounting one of said members in stationary position; a nut fixed to the other of said members; a screw spindle coaxially arranged with said nut and threadingly engaged therewith; means cooperating with said spindle for continuously applying torque thereto tending to turn said spindle in one direction so as to displace said other member relative to said stationary member; a ratchet wheel fixed to said spindle; and a pulse actuated escape mechanism cooperating with said ratchet wheel to permit during each actuation thereof turning of said ratchet wheel and said spindle, under the influence of said torque continuously applied to the latter, through an angular distance equal to the distance between two successive teeth of said ratchet wheel.

2. A device as defined in claim 1, wherein said container member is stationarily mounted and said nut is fixed to said plunger member.

3. A device as defined in class 2, wherein said container member is an elongated substantially cylindrical container and said container, said plunger member and said spindle are coaxially arranged.

4. A device as defined in claim 3, and including sealing means at said open end of said container and sealingly engaging the outer surface of said plunger member.

5. A device as defined in claim 1, wherein said torque applying means comprise a constantly rotating motor, transmission means between said motor and said spindle and including slip clutch means permitting said motor to rotate while said spindle is held stationarily.

6. A device as defined in claim 5, and including reversible switch means connecting said motor to a power source and constructed for reversing the direction of rotation of said motor.

7. A device as defined in claim 1, wherein said torque applying means comprises an electric motor directly connected with said spindle for rotation therewith, and a current source connected to said motor having a voltage lower than that necessary for operating said motor with full power.

8. A device as defined in claim 7, and including reversible switch means between said power source and said motor for reversing the direction of rotation of the latter.

9. A device as defined in claim 3, and including a second container member, a second plunger member projecting into said second container member, and a nut fixed to said second plunger and threadingly engaged with said spindle.

References Cited

UNITED STATES PATENTS

| | | | |
|---|---|---|---|
| 1,418,657 | 6/1922 | Kucharski | 185—38 |
| 1,716,487 | 6/1929 | Davis | 222—390 X |
| 2,715,991 | 8/1955 | Frank et al. | 222—390 X |
| 2,736,466 | 2/1956 | Rodth | 222—137 X |
| 2,905,361 | 9/1959 | Noall | 222—137 X |
| 3,103,121 | 9/1963 | Anderson et al. | 185—38 X |
| 3,173,575 | 3/1965 | Gugerli et al. | 222—333 X |
| 3,279,653 | 10/1966 | Pfleger | 222—333 X |

ROBERT B. REEVES, *Primary Examiner.*

F. R. HANDREN, *Assistant Examiner.*